United States Patent [19]

Gelbman

[11] Patent Number: 4,673,437

[45] Date of Patent: * Jun. 16, 1987

[54] CONCRETE BLOCK ADDITIVE AND IMPROVED CONCRETE BLOCKS PRODUCED THEREWITH

[76] Inventor: Lawrence F. Gelbman, 86 Hamilton Ave., Yonkers, N.Y. 10705

[*] Notice: The portion of the term of this patent subsequent to Feb. 4, 2003 has been disclaimed.

[21] Appl. No.: 824,059

[22] Filed: Jan. 30, 1986

Related U.S. Application Data

[63] Continuation-in-part of Ser. No. 623,989, Jun. 25, 1984, Pat. No. 4,568,390.

[51] Int. Cl.$^4$ ................................................ C04B 7/02
[52] U.S. Cl. ...................................... 106/97; 106/314; 106/DIG. 4; 264/336; 264/DIG. 43
[58] Field of Search .................... 106/97, 314, DIG. 4; 264/333, 336, DIG. 43

[56] References Cited

U.S. PATENT DOCUMENTS

| | | | |
|---|---|---|---|
| 1,710,921 | 4/1929 | Cross | 106/97 |
| 1,885,731 | 11/1932 | Kraus | 106/97 |
| 2,526,674 | 10/1950 | Larsen | 106/97 |
| 2,876,123 | 3/1959 | Drummond | 106/314 |
| 4,230,499 | 10/1980 | Nakagawa et al. | 106/97 |
| 4,257,814 | 3/1981 | Kellet et al. | 106/90 |
| 4,568,390 | 2/1986 | Gelbman | 106/DIG. 4 |

*Primary Examiner*—William R. Dixon, Jr.
*Assistant Examiner*—Steven Capella
*Attorney, Agent, or Firm*—Parmelee, Bollinger & Bramblett

[57] ABSTRACT

An additive used in the production of concrete blocks comprises a mixture of water with attapulgite or peptized calcium bentonite. Problem concrete blocks which previously were normally subject to improper molding or cracking during the molding, unmolding, handling and curing steps during the manufacture thereof, are now easily produced and properly molded without cracking resulting during any of these steps. Whereas, it was previously nearly impossible to manufacture any acceptable concrete blocks without employing sufficient quantities of fines in the concrete block mix, the additive allows formation of acceptable concrete blocks in the absence of any fines at all, thereby enabling much more reliable production of standard blocks, thin-walled blocks, and even more lightweight blocks than heretofore possible, because the gradation and characteristics and relative proportions of the coarse and fine constituents of the aggregate in the mix are rendered far less critical than heretofore. The process of molding concrete blocks is rendered more efficient and quicker by the use of the additive and productivity is considerably increased, because the occurrence of "culls", cracked and defective blocks, is dramatically reduced or eliminated. Also, the process for the formation of concrete blocks is improved by the use of additive in allowing easier and faster packing of the mix into the molds and easier stripping of the molded blocks from the block molds.

43 Claims, No Drawings

CONCRETE BLOCK ADDITIVE AND IMPROVED CONCRETE BLOCKS PRODUCED THEREWITH

RELATED APPLICATION

This Application is a continuation-in-part of my earlier U.S. patent application Ser. No. 623,989, filed on June 25, 1984 now U.S. Pat. No. 4,568,390.

FIELD OF THE INVENTION

The invention relates to the field of concrete block technology and more specifically to an additive and its use in concrete block mold mixes to produce concrete blocks more efficiently and without cracking or improper molding thereof. The invention also relates to an improved process for the formation of concrete blocks using the additive in concrete block mold mixes and especially in the concrete block mold mixes with a dificiency or an absence of heretofore required fines or with a non-traditional gradation of coarse and fine aggregates.

BACKGROUND OF THE INVENTION

One problem usually and often encountered in the production of concrete blocks is that mixes with a preponderance of coarse aggregates do not pack well in the high-production block molding machines, such as high speed vibration molding machines, used to produce such blocks. The improper packing of the coarse aggregate leads to the formation of improperly molded blocks that are structurally unsound or weak. The problem is especially pronounced when the conventional concrete block mix contains the highly desirable lightweight aggregates, such as cinders, pumice and those that are produced by burning of clay, shale or the like. In such cases the block mixes are very hard to pack properly and do not have the usual cohesiveness that is characteristic of traditional high density sand and gravel aggregate mixes with a traditional, conventional gradation in sizes and relative proportions of coarse and fine constituents.

Moreover, certain concrete blocks are known as "problem" blocks because their size, shape and/or face shell characteristics render them difficult to molds and handle even when generally acceptable well-graded aggregate is employed. As examples of such problem blocks there can be mentioned, for example, the two-core 12 inch block which has long and wide unsupported face shells, the 6 inch concrete block having thin face shells, as well as bond-beam blocks that have unique shapes and 2 inch patio blocks, which being solid, require a large amount of block mix material uniformly packed over a large top-of-mold area. Since patio blocks are molded on edge in the vertical plane, the top of the block in the mold is actually one of the edges, which sags, and thus often has an undesirable concave edge as molded. In addition, paving blocks are an especially difficult problem block to mold because being only about $3\frac{5}{8}$ inches high with a relatively large top area of 18×24 inches, this large area of the paving block contacting the molding machine's pressure head tends to stick to the pressure head plate because of suction. On unmolding of the paving blocks from the mold many of these tops are actually "torn" from the remainder of the block, causing defective blocks.

Furthermore, in producing any concrete blocks whether problem blocks or not, when there is deficiency or diminished gradation of fine aggregate in the concrete block mix, a particularly acute problem of cracking and splitting occurs when blocks employing such mix (that is deficient in fines) is manufactured in high speed vibration block molding machines. Such cracking and splitting generally occurs most frequently upon ejection of the molded block from the machine's mold box. Moreover, it has been practically impossible to mold any type of acceptable concrete blocks when a block mix is not merely deficient in fines but where such fines are entirely absent.

In the prior art production of problem blocks, it has been accepted for many years at block manufacturing plants that a substantial percentage of cracked and defective blocks will usually result during each molding and curing cycle. Such useless blocks are known as "culls". They are crushed, and the resulting fragments and particles are recycled as coarse aggregate. It has been accepted practice to tolerate and be content with an overall "cull" production rate of generally about 5% or more, and in some cases up to about 10% or even up to 20% of the overall production runs of the various problem blocks or up to 20% of the run of non-problem blocks when using "problem" aggregates. Moreover, such problem aggregate cracking in about 90% of the blocks produced has been experienced, and the industry has had to accept the use of these cracked but still somewhat serviceable blocks, because such high percentages of cracking was considered inevitable by those in the industry. Such "culls" represent a substantial loss in productivity, a substantial economic drag on a block-making plant, and lead to increased costs. It would, therefore, be highly desirable to provide an additive for a block mix which would dramatically reduce or even eliminate culls when producing the particular shapes and types of blocks which have previously been considered to be problem blocks.

Even in the production of ordinary non-problem blocks, there is a significant incidence of "culls", up to about 5% of the production runs. It would be highly desirable to provide an additive for a block mix which would substantially avoid or eliminate culls in the production of ordinary, run-of-the-mill, non-problem blocks of all types.

It is highly desirable for numerous reasons known in the art to want to produce or manufacture lightweight concrete blocks. In view of the aforementioned difficulties of molding acceptable concrete block using lightweight coarse aggregate or coarse aggregate deficient in fines, concrete block manufacturers who are producing such lightweight concrete blocks have found it necessary to add sand or stone dust, for example, to attempt to provide the necessary cohesive effect of fine aggregate in order that the block mix may be properly packed and acceptable blocks produced. However, the addition of such fine materials is highly disadvantageous in certain cases in that it undesirably increases the weight of the resulting concrete blocks thereby offsetting the advantages hoped to be gained by the use of the lightweight coarse aggregate. Moreover, the addition of sand or stone dust does not satisfactorily cure the mold packing problem. It would, therefore, be highly desirable to provide an additive which enables block manufacturers to produce acceptable concrete blocks from lightweight coarse aggregate deficient in fines and more particularly, lightweight coarse aggregate in which fines are totally absent and to do so without any substantial increase in the weight of the resulting concrete blocks.

SUMMARY OF THE INVENTION

It has been discovered that an additive which comprises a mixture of water and a member selected from attapulgite and peptized calcium bentonite can be added to a concrete block mix to produce "concrete block mold mix" providing surprisingly great benefits and that the use of such additive eliminates or substantially avoids all of the problem areas set forth hereinbefore with respect to the production of concrete blocks. Moreover, the use of such an additive in a concrete block mix enables the production of acceptable concrete blocks from coarse aggregates deficient or even absent in fines. Thus, a formulation (termed a "concrete block mold mix" to distinguish from conventional concrete block mixes without the additive of the invention) of a concrete block mix containing the attapulgite or peptized calcium bentonite-water mixture additive represents a substantially improved concrete block mold mix for use in high-production block molding machines for producing blocks of greatly improved strength and greatly decreased fragility avoiding or almost completely avoiding the usual percentages of culls in production runs of all types of blocks, as well as permitting the easy and routine molding of concrete blocks heretofore known as "problem" blocks or blocks made with "problem" blocks or blocks made with "problem" aggregates.

DETAILED DESCRIPTION OF THE INVENTION

While the additive of this invention preferably comprises a colloidal suspension (hereinafter referred to as mixture) of attapulgite or peptized calcium bentonite and water in a weight ratio of about 1:10 (about 9.1% solids) the ratio of the two respective components can range from about 1:4 (about 20.0% solids) to about 1:20 (about 4.8% solids). The 1:10 mixture is preferred since it forms an extremely stable, non-separating mixture having a viscosity enabling the mixture to be most easily handled; that is, easily pumped and dispensed. Addtionally, such an additive product can be stored for indefinite periods before use without separation occurring. Such a product can even be frozen and when thawed can be used as described herein without requiring any additional mixing or stirring. However, additive mixtures richer in attapulgite or peptized calcium bentonite, for example, the 1:4 ratio mixture, while too viscous to easily handle through ordinary pumps may still be used where pumping is not required, where special dispensing capabilities are present or can be used as a concentrate in special cases. On the other hand, additive mixtures much leaner in attapulgite or peptized calcium bentonite, for example, at a 1:20 ratio mixture, are much less viscous and while easily handled require much more additive to achieve the same effect as obtained with the preferred 1:10 ratio mixture. Also, as the 1:20 ratio of components in the additive is approached the additive mixture tends to show an increasing proportion of separation on standing. However, with stirring of the additive before use, it is again rendered homogeneous and can be used as discussed.

While any suitable peptized calcium bentonite can be employed in the additive, in the concrete block mix formulation and in the process of this invention, it is preferred that powdered peptized calcium bentonite having an average particle size such that 99% minimum passes through a 200 mesh (74 microns) screen be employed.

The peptized calcium bentonite useful in the additive of this invention can be any suitable colloid clay (silicate of alumina) comprised principally of the clay mineral montmorillonite and can generally be in a granular form of any suitable gradation or in a powder form, although as indicated a powdered form thereof is preferred. Calcium bentonite which has not been peptized does not provide a suitble additive according to this invention.

Any suitable attapulgite can be employed in the additive, in the concrete block mix formulation and in the process of this invention. Attapulgite is a hydrated aluminum-magnesium silicate $(Mg,Al)_5Si_8O_{22}(OH)_4 \cdot 4H_2O$. It is preferred that the powdered attapulgite be employed as the attapulgite component of this invention, although granular attapulgite may also be employed. As examples of attapulgites found useful in this invention there may be mentioned, for example, attapulgite powder such as X-2059 or Attagel 40, both available from the Minerals and Chemicals Division of Englehard, Edison, N.J.

The colloidal suspension of attapulgite or peptized calcium bentonite in water can be prepared by the addition of attapulgite or peptized calcium bentonite to water with any suitable mixing and stirring apparatus such as a high speed mixer stirrer or by addition of the attapulgite or calcium bentonite to water and subsequent mixing of the two components with any suitable air jet agitating mixer. Such an air jet mixer could be, for example, a pipe connected to a suitable source of pressurized air, such as shop air in the range from 60 p.s.i. to 120 p.s.i., which pipe is capped at the air discharge end with a cap containing a plurality of air discharge holes or vents in the outer periphery of the cap and positioned perpendicular to the axis of the pipe. For example, a ⅜ inch pipe capped with a cap containing four ⅛ inch holes spaced approximately uniformly in the periphery of the cap is a suitable mixer for mixing attapulgite or peptized calcium bentonite and water in conventional 55 gallon drums. For example, adding 25 pounds of powdered peptized calcium bentonite to 30 gallons (about 250 pounds) of water in a 55 gallon drum and mixing with the above described air jet mixer for a period of about two to five minutes produces a preferred additive mixture of the invention. Of course, larger batches of such additive mixture can be prepared when desired, such as for example, by mixing 200 pounds of powdered peptized calcium bentonite in about 250 gallons (about 2085 pounds) of water in commercially availble 400 or 500 gallon tanks.

The additive mixture of the invention is employed in concrete block mixes to provide the improved concrete block mold mix formulations of this invention. Generally it has been found that the use of from about 2 quarts to about 14 quarts of the heretofore described additive mixture per 3 cubic yards of concrete block mix provides the benefits of this invention as discussed hereinbefore and hereinafter. As little as 2 quarts of the additive mixture can be used to provide the benefits of this invention for molding non-problem blocks when using aggregate having a good gradation of particle sizes including sufficient fines. More than about 14 quarts of additive can be used per 3 cubic yards of concrete block mix, but such large portions of the additive become more expensive and require more mixing time and do not produce increased benefits, and thus are generally uneconomic and wasteful. It is preferred that about 3 to about 6 quarts, most preferably about 3 to about 4 quarts, of the additive mixture per 3 cubic yards of concrete block mix be employed for optimum results and molding efficiency and optimum economics. However, when the concrete block mix is entirely deficient in fines (that is, fines are absent from the mix) it is preferred to employ from about 4 to about 14 quarts, preferably at least about 6 to about 13 quarts, of additive per 3 cubic yards of block mix. It will be appreciated that it is possible to use somewhat less and somewhat more of the additive and still obtain the beneficial effects of this invention, it only being necessary that an amount sufficient to produce the described results be employed.

When the additive mixture is added to a concrete block mix to provide a concrete block mix formulation of this invention, the resulting formulation can be employed in the molding of concrete blocks heretofore known as "problem" blocks and the problems with cracking, tearing, fragility during unmolding, handling and during steam curing, sags in the molding of patio blocks, torn-off upper surfaces of paving blocks, and the like are eliminated or almost completely eliminated. Moreover, such formultions permit the production of both problem and non-problem blocks with enhanced efficiency since such block mold mix formulations are handled easier in high speed vibrating block molding machines and the blocks strip from the mold easier, resulting in speeding up the molding and unmolding operation by about 10 to 20 percent or more; that is, shortening the operating cycle of the machine by about 1 to 2 seconds or more. The addition of the additive to the concrete block mix makes the mix more truly homogeneous and provides improved cohesiveness to the molded block. Also, the concrete block mold mix formulation produces molded block of more uniform surface texture and provides a highly desirable sheen to the surfaces of the blocks. Blocks with this type of attractive sheen are considered by masons and block-laying mechanics to be of superior value, because the resulting block wall has an enhanced appearance and is less abrasive to the touch. Moreover, all culls and concave tops are eliminated or dramatically reduced in the molded blocks.

Still further, it is now possible to mold acceptable concrete blocks employing lightweight aggregate block mixes deficient or even absent in fines which has not heretofore been possible. Moreover, despite the addition of extra water to the block mix by way of the addition of the attapulgite or peptized calcium bentonite-water mixture, the water does not come to the surface of the block mix. Rather, the block mix formulation is truly homogeneous, and there is no separation of this water, cement and aggregate.

The following examples are illustrative but not limiting of the invention.

EXAMPLE 1

Three quarts of a 1:10 powdered peptized calcium bentonite-water mixture are added to 3 cubic yards of a concrete block mix comprising:

| | |
|---|---|
| 3500 lbs. lightweight aggregate (avg. 63 lb/Ft$^3$) = | 55.55 cu. ft. |
| 2000 lbs. fines-sand (avg. 100 lb/Ft$^3$) = | 20.00 cu. ft. |
| 550 lbs. Portland cement (avg. 94 lb/Ft$^3$) = | 5.85 cu. ft. |
| water - sufficient to hydrate the cement | 81.40 cu. ft. | to provide an improved concrete block mold mix formulation of this invention.

In a block plant using a high speed vibrating concrete block molding machine, the above described formulation can be employed as the mold mix to produce two-core 12 inch blocks, 6 inch blocks and bond-beam blocks to substantially stop cracking of these "problem" blocks and to eliminate all culls. When used to mold 2 inch patio blocks, the mold will be filled uniformly and all concave tops eliminated.

EXAMPLE 2

In a block plant employing the concrete block mix described in Example 1 but not containing the additive mixture, the operators of the plant had been unsuccessful in producing acceptable 3⅜ inch high paving blocks over an eight month period. When three quarts of the 1:10 peptized calcium bentonite-water mixture is added to the concrete block mix to produce a concrete block mold mix formulation of this invention, acceptable 3⅜ inch paving blocks are produced by eliminating the tearing of the large area tops of the blocks due to the suction heretofore caused during the unmolding steps of this cycle.

EXAMPLE 3

In a manner similar to that described in Example 1, non-problem blocks such as three-core 8 inch blocks are easily molded on the high speed vibrating concrete block molding machine in a block plant using the concrete block mold mix formulation of the invention as described in Example 1. The resulting blocks will have a very uniform surface texture and desirable sheen on the surface. Moreover, the cycling time of the machine's operation will be reduced and made more efficient because of the increased packability and easier stripping that the additive mixture imparts to the block mix formulation.

EXAMPLE 4

To a lightweight concrete block mix (in which fines are absent, i.e. containing no sand or fine aggregate) but comprising only:

| | |
|---|---|
| lightweight aggregate +¼" to −3/8" | 1.25 cu. yd. |
| 400 lbs. Portland cement | 4.25 cu. ft. |
| water - sufficient to hydrate the cement | | from which it has not heretofore been possible to mold acceptable concrete block, there is added 6 quarts of additive comprising a 1:10 powdered peptized calcium bentonite-water mixture per 3 cubic yards of the described block mix to produce a block mold mix formulation of this invention. The use of the resulting formulation (devoid of fines) as the mold mix in a high speed vibratory concrete block molding machine in a block plant produces acceptable two-core 12 inch block, even though such block was a "problem" block when conventional mixes containing sufficient fines were employed. In other words, these two-core 12 inch blocks are able to be produced without problems using a formulation containing no fines at all, and this dramatic, improved result is obtained with a "problem" block despite the fact that such a formulation (devoid of fines) heretofore could not be made into any acceptable block at all, regardless of whether problem or non-problem blocks were involved.

In addition, when it is attempted to break such a concrete block produced according to this invention and containing no fines in the concrete block mix, fracture of the block will occur by the aggregate breaking rather than by cracking of the cement as is normally the case with previously produced concrete blocks, thus showing that the resultant bonding produced is actually stronger than the aggregate itself.

Thus, with the additive mixtures of this invention it has been found that no matter how deficient in fines, a coarse or lightweight aggregate may be, it becomes an acceptable block mix with the addition of the attapulgite or peptized calcium bentonite-water additive mixture according to this invention.

EXAMPLE 5

Four quarts of a 1:10 granular attapulgite granules and water mixture are added to 3 cubic yards of a concrete block mix comprising:

| | |
|---|---|
| 2625 lbs. lightweight aggregate (avg. 63 lb/Ft$^3$) = | 41.67 cu. ft. |
| 3250 lbs. fines-sand (avg. 100 lb/Ft$^3$) = | 32.50 cu. ft. |
| 600 lbs. Portland cement (avg. 94 lb/Ft$^3$) = | 6.38 cu. ft. |
| | 80.55 cu. ft. | to provide an improved concrete block mold mix formulation of this invention.

Typical lightweight concrete block mixes extend throughout the range from that set forth in Example 1 to that in Example 5. In other words, in a 3 cubic yard mix, the lightweight aggregate is in the range from 3,500 to 2,625 lbs. The fines content is in the range from 2,000 to 3,250 lbs. As the amount of fines is increased in this range, the Portland cement content is increased from 550 lbs. to 600 lbs.

While the invention has been described in the mode wherein the colloidal suspension of attapulgite or peptized calcium bentonite in water is prepared beforehand and then is added to the concrete block mix, it is also possible that the attapulgite or peptized calcium bentonite-water colloidal suspension be added as the total water component of the concrete block mix, that is, a very dilute attapulgite or peptized calcium bentonite-water colloidal suspension is prepared using the total water component intended to be employed for the final block mix. For example, the weight ratio of attapulgite or peptized calcium bentonite to total water is only 1 to 360. The total water is agitated and is used promptly to avoid separation and to keep homogeneous. This 1:360 weight ratio of attapulgite or peptized calcium bentonite to total water is obtained by adding 4 quarts of the preferred 1:10 ratio mixture additive to about 35 gallons of total water.

Although the above describes the typical and best formulations and methods of this invention, the invention is not to be limited to these examples which are to be considered merely examplary of this invention.

The invention claimed is:

1. A concrete block mold mix for the production of concrete blocks in a vibratory concrete block molding machine in which the mold mix comprises cement, water in an amount only sufficient to hydrate the cement, and from about 2 to about 14 quarts, per 3 cubic yards of mold mix, of a colloidal suspension of a member selected from the group consisting of attapulgite or peptized calcium bentonite in water in a weight ratio of attapulgite or peptized calcium bentonite to water of from about 1:4 to about 1:20.

2. A concrete block mix of claim 1, wherein the weight ratio of attapulgite or peptized calcium bentonite to water is about 1:10.

3. A concrete block mold mix of claim 1, wherein the colloidal suspension is one of water and powdered peptized calcium bentonite having an average particle size such that substantially 99% minimum passes through a 200 mesh screen.

4. A concrete block mold mix of claim 2, wherein the colloidal suspension is one of water and attapulgite.

5. A concrete block mold mix of claim 1, wherein the mix has incorporated therein about 3 quarts of colloidal suspension per 3 cubic yards of mold mix.

6. A concrete block mold mix of claim 2, wherein the mix has incorporated therein about 3 to about 6 quarts of colloidal suspension per 3 cubic yards of mold mix.

7. A concrete block mold mix of claim 3, wherein the mix has incorporated therein about 3 quarts of colloidal suspension per 3 cubic yards of mold mix.

8. A concrete block mold mix of claim 4, wherein the mix has incorporated therein about 3 to about 6 quarts of colloidal suspension per 3 cubic yards of mold mix.

9. A concrete block mold mix of claim 1, wherein the mix has incorporated therein about 6 quarts of colloidal suspension per 3 cubic yards of mold mix.

10. A concrete block mold mix of claim 2, wherein the mix has incorporated therein about 6 quarts of colloidal suspension per 3 cubic yards of mold mix.

11. A concrete block mold mix of claim 3, wherein the mix has incorporated therein about 6 quarts of colloidal suspension per 3 cubic yards of mold mix.

12. A concrete block mold mix of claim 4, wherein the mix has incorporated therein about 6 quarts of colloidal suspension per 3 cubic yards of mold mix.

13. A concrete block mix of claim 5, or 7 comprising about 3 quarts of the colloidal suspension per 3 cubic yards of a concrete block mix comprising about 3500 lbs. lightweight aggregate, about 2000 lbs. fines, about 550 lbs. Portland cement and water sufficient to hydrate the cement.

14. A concrete block mold mix of claim 9, 10, 11 or 12, comprising about 6 quarts of the colloidal suspension per 3 cubic yards of a concrete block mix containing no fines.

15. A concrete block mold mix of claim 1, comprising about 6 quarts of a 1:10 weight ratio colloidal suspension of water and a member selected from the group consisting of attapulgite and peptized calcium bentonite per 3 cubic yards of a block mix containing no fines and comprising about 1.25 cubic yards +⅛" to +⅜" lightweight aggregate, about 4.25 cubic ft. Portland cement and sufficient water to hydrate the cement.

16. In a process of molding concrete blocks in a vibratory concrete block molding machine the improvement comprising using the concrete block mold mix of claim 1.

17. In a process of molding concrete blocks in a vibratory concrete block molding machine the improvement comprising using the concrete block mold mix of claim 2.

18. In a process of molding concrete blocks in a vibratory concrete block molding machine the improvement comprising using the concrete block mold mix of claim 3.

19. In a process of molding concrete blocks in a vibratory concrete block molding machine the improvement comprising using the concrete block mold mix of claim 4.

20. In a process of molding concrete blocks in a vibratory concrete block molding machine the improvement comprising using the concrete block mold mix of claim 5.

21. In a process of molding concrete blocks in a vibratory concrete block molding machine the improvement comprising using the concrete block mold mix of claim 6.

22. In a process of molding concrete blocks in a vibratory concrete block molding machine the improvement comprising using the concrete block mold mix of claim 7.

23. In a process of molding concrete blocks in a vibratory concrete block molding machine the improvement comprising using the concrete block mold mix of claim 8.

24. In a process of molding concrete blocks in a vibratory concrete block molding machine the improvement comprising using the concrete block mold mix of claim 9.

25. In a process of molding concrete blocks in a vibratory concrete block molding machine the improvement comprising using the concrete block mold mix of claim 10.

26. In a process of molding concrete blocks in a vibratory concrete block molding machine the improvement comprising using the concrete block mold mix of claim 11.

27. In a process of molding concrete blocks in a vibratory concrete block molding machine the improvement comprising using the concrete block mold mix of claim 12.

28. In a process for molding concrete blocks in a vibratory concrete block molding machine the improvement comprising using as the block mold mix a formulation comprising 3 to 6 quarts of a 1:10 weight ratio of a colloidal suspension of water and a member selected from the group consisting of attapulgite and peptized calcium bentonite per 3 cubic yards of a concrete block mix comprising about 3500 to about 2625 lbs. lightweight aggregate, about 2000 to about 3250 lbs. fines, about 550 to about 600 lbs. Portland cement and water sufficient to hydrate the cement.

29. In a process for molding concrete blocks in a vibrating concrete block molding machine the improvement comprising using as the block mold mix a formulation comprising about 6 quarts of a 1:10 weight ratio of a colloidal suspension of water and a member selected from the group consisting of attapulgite and peptized calcium bentonite per 3 cubic yards of a block mix containing no fines and comprising about 1.25 cubic yards $+\frac{1}{8}''$ to $-\frac{7}{8}''$ lightweight aggregate, about 4.25 cubic ft. Portland cement and sufficient water to hydrate the cement.

30. A concrete block molded from a concrete block mold mix containing cement, water in an amount only sufficient to hydrate the cement and from about 2 to about 14 quarts, per 3 cubic yards of mold mix, of colloidal suspension of a member selected from the group consisting of attapulgite and peptized calcium bentonite in water, in a weight ratio of attapulgite or peptized calcium bentonite to water of about 1:4 to about 1:20.

31. A concrete block molded from a concrete block mold mix containing cement, water in an amount only sufficient to hydrate the cement and from about 3 to 6 quarts, per 3 cubic yards of mold mix, of colloidal suspension of a member selected from the group consisting of attapulgite and peptized calcium bentonite in water, in a weight ratio of attapulgite or peptized calcium bentonite to water of about 1:4 to about 1:20.

32. A concrete block of claim 30, wherein the colloidal suspension is one of peptized calcium bentonite in water in which the ratio of peptized calcium bentonite to water in a mold mix is about 1:10.

33. A concrete block of claim 30, wherein the colloidal suspension is one of granular attapulgite.

34. A concrete block of claim 30, wherein the concrete block mold mix has about 3 quarts of colloidal suspension per 3 cubic yards of concrete block mix.

35. A concrete block of claim 32, wherein the concrete block mold mix has about 3 quarts of colloidal suspension per 3 cubic yards of concrete block mix.

36. A concrete block of claim 33, wherein the concrete block mold mix has about 3 quarts of colloidal suspension per 3 cubic yards of concrete block mix.

37. A concrete block of claim 34, 35 or 36, wherein the concrete block mold mix comprises 3 quarts of the colloidal suspension per 3 cubic yards of a concrete block mix comprising about 3500 lbs. lightweight aggregate, about 200 lbs. fines, about 550 lbs. Portland cement and water sufficient to hydrate the cement.

38. A concrete block of claim 34, 35 or 36, wherein the concrete block mold mix comprises about 6 quarts of colloidal suspension per 3 cubic yards of a concrete block mix containing no fines and comprising about 1.25 cubic yards $+\frac{1}{8}''$ to $+\frac{3}{8}''$ lightweight aggregate, about 4.25 cubic ft. Portland cement and water sufficient to hydrate the cement.

39. A concrete block of claim 30, 31, 32, 33, 34, 35 or 36, which is a molded concrete block selected from the group consisting of a two-core 12 inch block, a 6 inch block, a bond-beam block, a patio block or a $3\frac{5}{8}''$ high paving block.

40. A concrete block mold mix of claim 1, wherein the mix has incorporated therein about 6 to about 13 quarts of colloidal suspension per 3 cubic yards of mold mix.

41. A concrete block mold mix of claim 2, wherein the mix has incorporated therein about 6 to about 13 quarts of colloidal suspension per 3 cubic yards of mold mix.

42. A concrete block mold mix of claim 3, wherein the mix has incorporated therein about 6 to about 13 quarts of colloidal suspension per 3 cubic yards of mold mix.

43. A concrete block mold mix of claim 4, wherein the mix has incorporated therein about 6 to about 13 quarts of colloidal suspension per 3 cubic yards of mold mix.

* * * * *